(12) United States Patent
Ahmad et al.

(10) Patent No.: US 9,696,789 B2
(45) Date of Patent: Jul. 4, 2017

(54) SUB-SYSTEM POWER MANAGEMENT CONTROL

(71) Applicant: Xilinx, Inc., San Jose, CA (US)

(72) Inventors: Sagheer Ahmad, Cupertino, CA (US); Ahmad R. Ansari, San Jose, CA (US); Soren Brinkmann, Santa Cruz, CA (US)

(73) Assignee: XILINX, INC., San Jose, CA (US)

( * ) Notice: Subject to any disclaimer, the term of this patent is extended or adjusted under 35 U.S.C. 154(b) by 233 days.

(21) Appl. No.: 14/462,492

(22) Filed: Aug. 18, 2014

(65) Prior Publication Data

US 2016/0048193 A1 Feb. 18, 2016

(51) Int. Cl.
*G06F 1/32* (2006.01)
*G06F 13/24* (2006.01)

(52) U.S. Cl.
CPC .......... *G06F 1/3287* (2013.01); *G06F 1/3215* (2013.01); *G06F 13/24* (2013.01); *Y02B 60/1228* (2013.01)

(58) Field of Classification Search
None
See application file for complete search history.

(56) References Cited

U.S. PATENT DOCUMENTS

| | | | |
|---|---|---|---|
| 7,617,471 B1 | 11/2009 | Seng et al. | |
| 7,685,347 B2 | 3/2010 | Gibbs | |
| 7,852,109 B1 | 12/2010 | Chan et al. | |
| 8,079,009 B1 | 12/2011 | Sinclair | |
| 8,217,911 B2 | 7/2012 | Gettemy et al. | |
| 8,352,659 B1 | 1/2013 | Styles et al. | |
| 8,667,192 B2 | 3/2014 | Allaire et al. | |
| 8,762,759 B2* | 6/2014 | Williams | G06F 1/3203 713/323 |
| 2009/0164817 A1* | 6/2009 | Axford | G06F 1/3203 713/322 |
| 2012/0047402 A1 | 2/2012 | Chen et al. | |
| 2012/0151152 A1* | 6/2012 | Minami | G06F 12/0831 711/146 |
| 2014/0181557 A1 | 6/2014 | Branover et al. | |
| 2014/0215252 A1* | 7/2014 | Fullerton | G06F 1/00 713/324 |

* cited by examiner

*Primary Examiner* — Thomas Lee
*Assistant Examiner* — Vincent Chang
(74) *Attorney, Agent, or Firm* — LeRoy D. Maunu

(57) ABSTRACT

An apparatus is disclosed that includes a processing sub-system having a plurality of processor circuits and an interrupt control circuit. The interrupt control circuit is configured to, in response to a peripheral interrupt, initiate performance of a task indicated by the peripheral interrupt by at least one of the plurality of processor circuits. The processing sub-system is configured to generate a power-down control signal in response to suspension of the plurality of processor circuits. A power management circuit disables power to the processing sub-system, including the interrupt control circuit, in response to the power-down control signal. The power management circuit enables power to the processing sub-system in response to a power-up control signal. The apparatus also includes a proxy interrupt control circuit configured to generate the power-up control signal in response to receiving a peripheral interrupt and power to the processing sub-system being disabled.

18 Claims, 6 Drawing Sheets

SUB-SYSTEM POWER MANAGEMENT CONTROL

FIELD OF THE INVENTION

The disclosure generally relates to power management control of circuits.

BACKGROUND

Programmable integrated circuits (ICs) are devices that can be programmed to perform specified logic functions. One type of programmable IC, the field programmable gate array (FPGA), typically includes an array of programmable tiles. These programmable tiles comprise various types of logic blocks, which can include, for example, input/output blocks (IOBs), configurable logic blocks (CLBs), dedicated random access memory blocks (BRAM), multipliers, digital signal processing blocks (DSPs), processors, clock managers, delay lock loops (DLLs), bus or network interfaces such as Peripheral Component Interconnect Express (PCIe) and Ethernet and so forth.

Each programmable tile typically includes both programmable interconnect and programmable logic. The programmable interconnect typically includes a large number of interconnect lines of varying lengths interconnected by programmable interconnect points (PIPs). The programmable logic implements the logic of a user design using programmable elements that can include, for example, function generators, registers, arithmetic logic, and so forth.

The programmable interconnect and programmable logic are typically programmed by loading a stream of configuration data into internal configuration memory cells that define how the programmable elements are configured. The configuration data can be read from memory (e.g., from an external PROM) or written into the FPGA by an external device. The collective states of the individual memory cells then determine the function of the FPGA.

Some programmable ICs include an embedded processor that is capable of executing program code. The processor can be fabricated as part of the same die that includes the programmable logic circuitry and the programmable interconnect circuitry, also referred to collectively as the "programmable circuitry" of the IC. It should be appreciated that execution of program code within a processor is distinguishable from "programming" or "configuring" the programmable circuitry that may be available on an IC. The act of programming or configuring the programmable circuitry of an IC results in the implementation of different physical circuitry as specified by the configuration data within the programmable circuitry.

SUMMARY

An apparatus is disclosed that includes a processing sub-system and a power management sub-circuit. The processing sub-system includes a plurality of processor circuits and an interrupt control circuit. The interrupt control circuit is configured to, in response to a peripheral interrupt, initiate performance of a task indicated by the peripheral interrupt by at least one of the plurality of processor circuits. The processing-sub-system is configured to generate a power-down control signal in response to suspension of the plurality of processor circuits. The power management circuit disables power to the processing sub-system, including the interrupt control circuit, in response to the power-down control signal. The power management circuit enables power to the processing sub-system in response to a power-up control signal. The apparatus also includes a proxy interrupt control circuit configured to generate the power-up control signal in response to receiving a peripheral interrupt and power to the processing sub-system being disabled.

A system is also disclosed. The system includes a first sub-system having a shared circuit, a plurality of processor circuits, and an interrupt control circuit. The processor circuits are configured to perform one or more operations using the shared circuit. In response to a peripheral interrupt, the interrupt control circuit initiates performance of a task indicated by the peripheral interrupt by at least one of the plurality of processor circuits. The first sub-system is configured to generate a power-down control signal in response to suspension of the plurality of processor circuits. The system also includes a second sub-system having circuits configured to perform one or more operations using the shared circuit. The system also includes a third sub-system having a power management circuit and a proxy interrupt control circuit. The power management circuit disables power to the first sub-system, including the interrupt control circuit, in response to the power-down control signal and the shared circuit being unused by the first and second sub-systems. The power management circuit also enables power to the first sub-system in response to the power-up control signal. The proxy interrupt control circuit generates the power-up control signal in response to receiving a peripheral interrupt and power to the first sub-system being disabled.

A method for operating a power management circuit is also disclosed. Using the power management circuit, power is provided to a first sub-system and a second sub-system. The second sub-system is configured to perform one or more operations using a shared circuit of the first sub-system. In response to a power-down request signal from the first sub-system, power is continued to be provided to the first sub-system while the shared circuit is being unused by the second sub-system. In response to the shared circuit being unused by the second sub-system, power is removed from the first sub-system.

Other features will be recognized from consideration of the Detailed Description and Claims, which follow.

BRIEF DESCRIPTION OF THE DRAWINGS

Various aspects and features of the disclosed methods and circuits will become apparent upon review of the following detailed description and upon reference to the drawings in which.

DETAILED DESCRIPTION OF THE DRAWINGS

Figure 1:
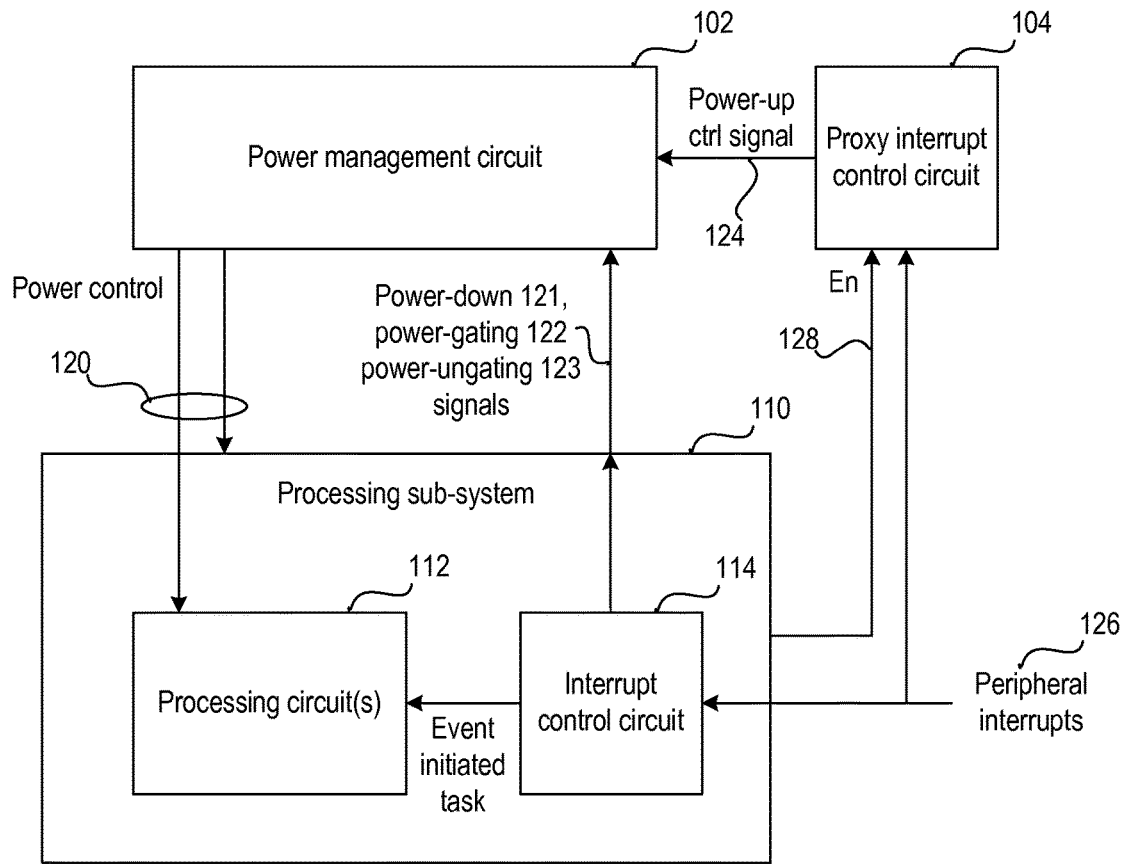
FIG. 1 shows a first device having an application processing circuit, power management circuit and proxy interrupt control circuit, consistent with one or more implementations.

Some processing sub-systems include multiple processors that may be suspended or powered down when idle to save power. Processing sub-systems typically include other circuits that continue to consume power while processors are suspended. These circuits are generally not powered down because they are needed for various tasks. For example, a processing sub-system may include circuits, such as a memory controller, that are shared with other sub-systems. As another example, processing sub-systems typically include an interrupt controller configured to wake a suspended processor when a task for the processor is initiated by an interrupt. Because the interrupt controller is needed to wake the suspended processors, it cannot be powered down when processors are suspended.

Circuits and methods are disclosed that enable an entire processing sub-system to be powered down—thereby reducing power consumption. In some implementations, a system includes a processing sub-system having a set of processors and an interrupt control circuit. A power management circuit is configured to disable power to the processing sub-system circuit (including the interrupt controller) when unused. In some implementations, the processing sub-system provides a power-down request signal to the power management circuit when all of the of processors have been suspended for a threshold period of time. The system includes a proxy-interrupt controller that is powered independent of the processing sub-system. The proxy-interrupt controller is configured to cause the power management circuit to enable power to the processing sub-system in response to an interrupt.

In some implementations, the processing sub-system includes one or more circuits that are shared with at least one other sub-system. The power management circuit is configured to only disable power to the processing sub-system circuit after the power-down request signal has been received and a power-down authorization signal has been received by each of the other sub-systems that uses the shared circuits of the processing sub-system.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same items; however, in alternative examples the items may be different.

Turning now to the figures, FIG. 1 shows a first device 100 having a processing sub-system, a power management circuit, and a proxy interrupt control circuit, in accordance with one or more implementations. The processing sub-system 110 includes one or more processing circuit(s) 112 and an interrupt control circuit 114. The interrupt control circuit 114 is configured to monitor peripheral interrupts 126 and initiate tasks on the processing circuit(s) 112 in response thereto. Interrupts may trigger a number of various processes. As one example, a hardware device connected to the system may generate an interrupt to read data values stored in a memory of the system.

The power management circuit 102 provides power control signals 120 to adjust power consumption of the processing sub-system 110 in response to control signals 121, 122, 123, and 124. The control signals may include, for example, a power-down control signal 121, a power-gating control signal 122, a power ungating control signal 123, and power-up control signals 124.

The power management circuit 102 is configured to suspend/resume various ones of the processing circuit(s) 112 in response to power-gating/power-ungating control signals received from the processing sub-system 110. The power management circuit 102 is configured to disable power to the processing sub-system 110 (including the interrupt control circuit 114) in response to the power-down control circuit. The power management circuit 102 is also configured to enable power to the processing sub-system 110 in response to a power-up control signal 124. For instance, an interrupt may be received that requires action by the processing circuits. However, as indicated above, while power to the processing sub-system 110 is disabled, the interrupt control circuit 114 is not available to monitor peripheral interrupts.

Proxy interrupt control circuit 104 is configured to monitor for peripheral interrupts when power to the processing sub-system is disabled. The proxy interrupt control circuit 104 is configured to generate the power-up control signal 124 in response to a peripheral interrupt for one of the processing circuits 112. In response to the power-up control signal, the power management circuit 102 enables power to the processing sub-system 110.

In some implementations, the proxy interrupt controller is enabled/disabled according to an enable signal 128 provided by the processing sub-system. Alternatively, the enable signal 128 may be provided by the power management circuit. In some embodiments, the proxy control circuit is configured to monitor the control signals 121, 122, and 123 provided to the power management circuit to determine when the processing sub-system is being disabled.

Figure 2:
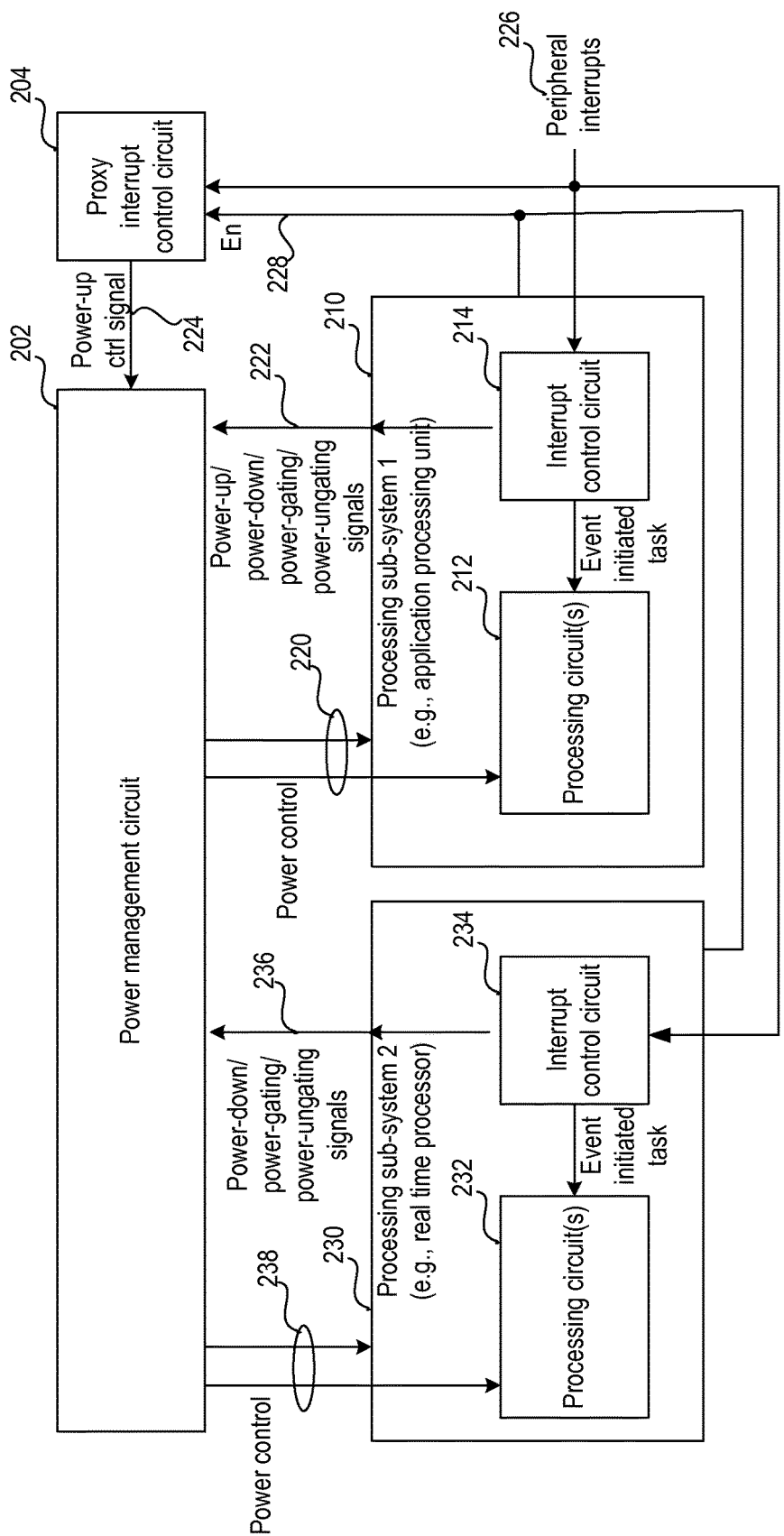
FIG. 2 shows a second device having an application processing circuit, power management circuit and proxy interrupt control circuit, consistent with one or more implementations.

In some implementations, the power management circuit may be adapted to control power for multiple sub-systems. FIG. 2 shows a second device having processing sub-systems, a power management circuit, and a proxy interrupt control circuit, in accordance with one or more implementations. The device 200 includes a first processing sub-system 210, a power management circuit 202, and a proxy interrupt control circuit 204 similar to the processing sub-system 110, power management circuit 102, and proxy interrupt control circuit 104 described with reference to in FIG. 1. In this example, the device 200 also includes a second processing sub-system 230.

Each of the processing sub-systems 210 and 230 includes a respective set of processing circuits 212 and 232 and a respective interrupt control circuit 214 and 234 configured to monitor peripheral interrupts 226 and initiate tasks on the processing circuit(s) 212 and/or 232 in response thereto.

The power management circuit 202 provides power control signals 220 and 238 to adjust power consumption of the processing sub-systems 210 and 230 in response to sets of control signals 222 and 236 received from the processing sub-systems. Each set of control signals 222 and 236 may include, for example, power-down/power-gating and power-up/power-ungating control signals. The power management circuit 202 is configured to suspend/resume various ones of the processing circuit(s) 212 and 232 in response to power-gating/power-ungating signals received from the respective processing sub-system. The power management circuit 202 is configured to disable power to the processing sub-system 210 in response to the power-down control signal from processing sub-system 210 and disable power to the processing sub-system 230 in response to the power-down control signal from processing sub-system 230. The power management circuit 202 also enables power to one of the processing sub-systems 210 or 230 in response to a power-up control signal 224 indicative of the one of the processing sub-systems 210 or 230.

Proxy interrupt control circuit 204 monitors for peripheral interrupts when power is disabled for either of the processing sub-systems 210 and 230. The proxy interrupt controller may be enabled, for example, by an enable control signal 228 asserted prior to one of the processing sub-systems 210 and 230 powering down. In response to a peripheral interrupt to a powered-down one of the processing sub-systems, the proxy interrupt control circuit 204 generates a power-up control signal to cause the power management circuit 202 to power up the processing sub-system.

Figure 3:
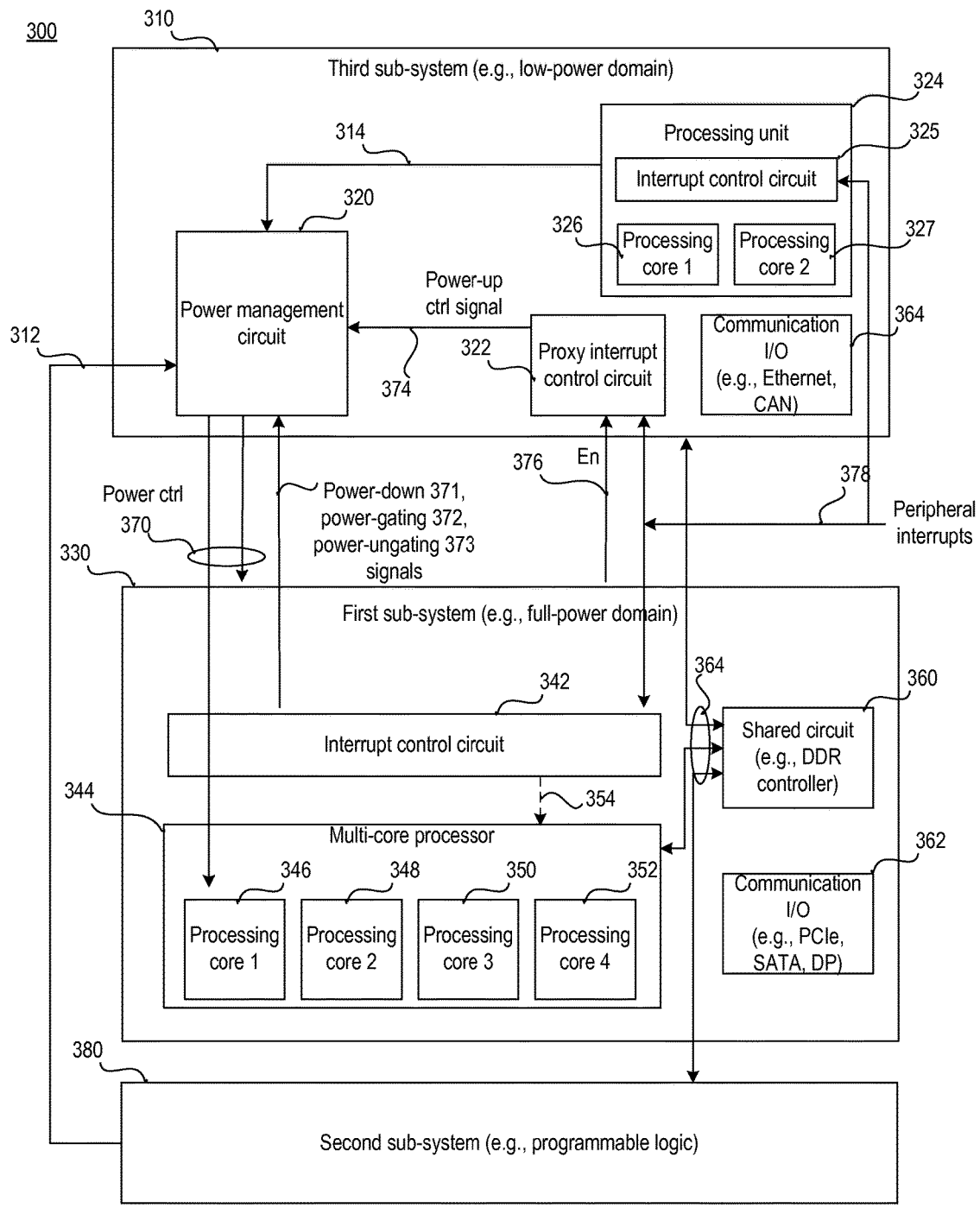
FIG. 3 shows a system, in accordance with one or more implementations.

FIG. 3 shows a system, in accordance with one or more implementations. The system 300 includes a first sub-system 330, a second sub-system 380, and a third sub-system 310. The first sub-system 330 has a multi-core processor 344 and an interrupt control circuit 342. In this example, the multi-core processor 344 includes four processing cores 346, 348, 350, and 352. In response to a peripheral interrupt, the interrupt control circuit 342 is configured to initiate performance of a task by one of the processing cores via control signals 354. The interrupt control circuit 342 also generates a power-down control signal 371 in response to all of the processing cores being suspended.

The first sub-system 330 includes one or more circuits 360 that are shared by other sub-systems of the system 300 via connections 364. For example, the second sub-system 380 of the system 300 may include circuitry configured to perform one or more operations using the shared circuit 360 of the first sub-system. In some implementations, the second sub-system includes programmable logic circuits that may be configured, in certain applications, to access a memory of the system (not shown) via a shared memory controller (e.g., 360) included in the first sub-system.

The third sub-system 310 includes a power management circuit 320 configured to adjust power consumption of the first sub-system. In this example, the first-sub-system 330 operates in a separate power domain from the second sub-system 380 and third sub-system 310 and may be powered down independently by the third sub-system 310.

In some implementations, the system 300 is configured to operate in a full-power mode and a low-power mode. When operated in the full-power mode, each of the power domains is powered up. When operated in the low-power mode, the power domain of the first sub-system is powered down. The power domain of the second and third sub-systems remains powered up when the system 300 is operated in the low power mode. Because the power domain of the first sub-system is powered down, in the low power mode, less power is consumed. For ease of reference, the power domain used to power the first sub-system may be referred to as the "full power domain" and the power domain used to power the third sub-system may be referred to as the "low-power domain." The full power domain is only powered up when the system 300 is operated in the full-power mode. The low power domain is the only power domain powered up when the system 300 is operated in the low-power mode.

In this example, the third sub-system 310 includes a power management circuit 320 configured to adjust power consumption of the first sub-system 330 via power control signals 370, in response to control signals 371, 372, and 373 from the first sub-system 330. For example, the power management circuit 320 may disable power to the first sub-system, including the interrupt control circuit, in response to the power-down control signal and the shared circuit 360 being unused by the second and third sub-systems 380 and 310. For instance, in some embodiments, the first sub-system 330 includes a memory controller for controlling access to a memory (not shown). Various circuits of the second sub-system 380 and third sub-system 310 may access the memory via the memory controller. In this example, the third sub-system includes a processing unit 324 including processing cores 326 and 327 and a respective interrupt control circuit 325. The processing cores 326 and 327 may access the memory via the shared memory controller of the first-sub-system.

In this example, the power management circuit 320 is configured to only power-down the first sub-system 330 after other sub-systems which use the shared circuit 360 provide authorization signals indicating that the shared circuit is not in use. In this example, the second sub-system provides authorization signal 312 to the power management circuit 320 when the shared circuit 360 is not needed by the second sub-system. Similarly, processing unit 324 provides authorization signal 314 to the power management circuit 320 when the shared circuit 360 is not needed by the processing unit 324. In some other implementations, the first sub-system is configured to receive the authorization signals and generate the power-down control signal only if the authorization signals indicate that the shared circuit 360 is unused.

The power management circuit 320 enables power to the first sub-system in response to a power-up control signal 374. The power-up control signal 374 is generated by a proxy interrupt control circuit 322, in response to receiving a peripheral interrupt 378 corresponding to the first sub-system while the proxy interrupt control circuit 322 is enabled by an enable control signal 376.

In this example, the power management circuit 320 is also configured to suspend/awaken various cores 346, 348, 350, and 352 of the multi-core processor 344 in response to receiving the power-gating control signal 372 or power-ungating control signals 373 from the first sub-system. The first sub-system generates the gating control signals to suspend one or more of the processing cores that have been idle for a threshold period of time. The first sub-system generates the ungating control signals to wake suspended processing cores when needed for processing in response to an interrupt from a peripheral device or another sub-system. The sub-systems of the system 300 may also include various other circuits, in addition to those discussed above, which may or may not be shared with other sub-systems. For instance, in this example, the first and third sub-systems include communication I/O circuits 362 and 364, respectively. In another implementation, the communication I/O circuit 362 may be shared with the third sub-system 310 and the communication I/O circuit 364 may be omitted. If the first sub-system includes multiple shared circuits, the first-sub-system is not powered down by the power management circuit 320 unless each of the shared circuits is unused.

Figure 4:
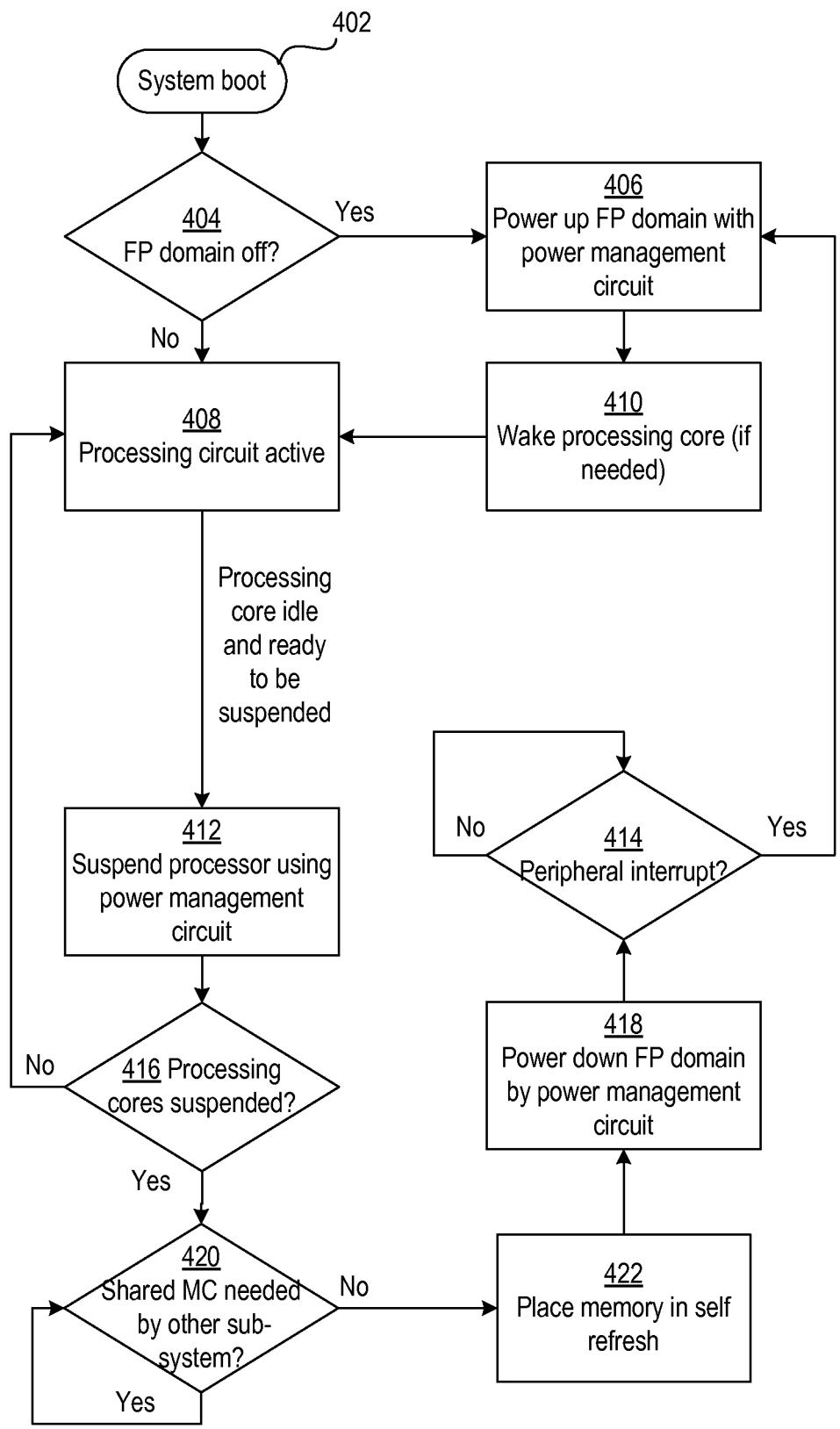
FIG. 4 shows a process for controlling power of individual sub-systems, consistent with one or more implementations.

FIG. 4 shows a process for controlling power of individual sub-systems, in accordance with one or more implementations. At system boot 402, if a full power domain is disabled, decision block 404 directs the process to enable the full power (FP) domain at block 406 using a power management circuit.

As discussed with reference to FIG. 3, the full power domain may be used to power a first sub-system including a processing circuit having a plurality of processing cores. After powering up the full power domain, a default processing core of the first sub-system may be awakened at block 410 (if needed). For instance, in some implementations, one processing core may be designated to wake at startup in case it is needed for processing. The processing circuit is active at block 408. When a processing core is idle and ready to be suspended, the processing core is suspended using a power management circuit at block 412.

At decision block 414, if one or more of the processing cores of the processing circuit are not suspended, the processing circuit continues to operate in the active state at block 408. Otherwise, if all of the processing cores of the processing circuit are suspended, it is possible that the full power domain may be powered down to save power. If all of the processing cores are suspended at decision block 416, the process is directed to decision block 420. The process repeats decision block 420 while a shared memory controller (MC) of the first sub-system is needed by other sub-systems to access a memory. If a shared memory controller is not needed by other sub-systems, for example, the process may place a memory in self-refresh mode at block 422 to save additional power. At block 418, the full-power domain that powers the first-sub-system is powered down by a the power management circuit.

The full-power domain remains powered down until a peripheral interrupt corresponding to the first sub-system is received at decision block 414. In response to the peripheral interrupt, the full-power domain is powered up with the power management circuit at block 406 and the process is repeated. If a specific processing core is required to process the peripheral interrupt, the process wakes the processing core at block 410.

Figure 5:
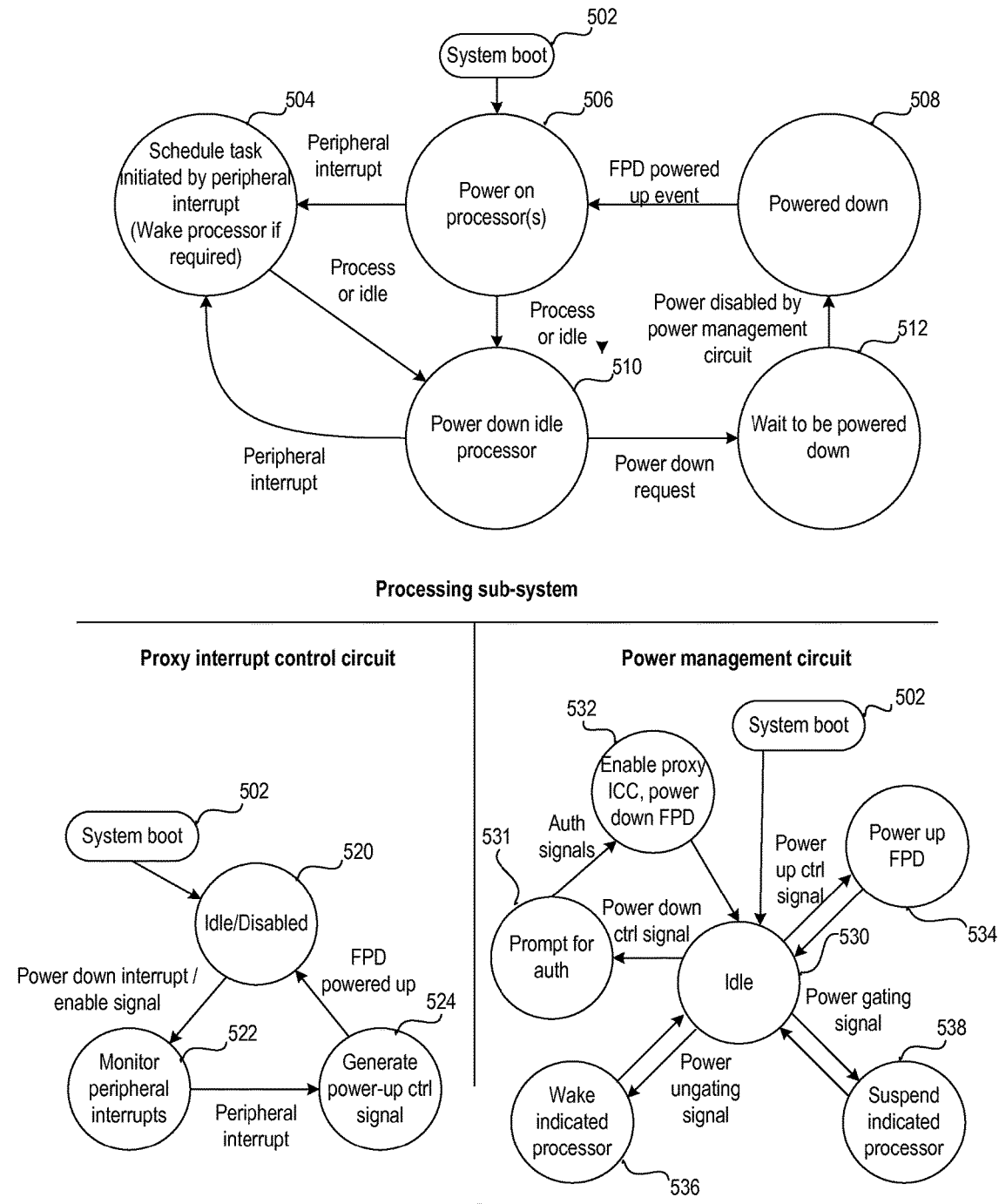
FIG. 5 shows example processes performed by an interrupt controller, proxy interrupt controller, and power management circuit, consistent with one or more implementations.

FIG. 5 shows processes performed by an interrupt controller, proxy interrupt controller, and power management circuit in an example implementation. At system boot 502, the power management circuit is initially in an idle state 530 and the proxy interrupt controller is initially in idle state 520. The interrupt control circuit initiates power-on of the processor(s) in state 506 by directing the power management circuit to power up the full-power domain in state 534. After which, the power management circuit returns to the idle state 530

In response to a peripheral interrupt, the interrupt control circuit transitions to state 504 where it schedules a task indicated by the peripheral interrupt. If required, the interrupt control circuit may also wake a suspended processor in state 504, for example, by generating a power ungating signal. In response to the power ungating signal, the power management circuit wakes the processor indicated by the power ungating signal at state 536 and then returns to the idle state.

If a processor is idle for a threshold period of time, a power-gating signal is generated at state 510 to cause the idle processor to be powered down. In some implementations, the power-gating signal may be generated by one of the processors. In some other implementations, the power-gating signal may be generated by another control circuit, such as the interrupt control circuit. In response to the power-gating signal, the power management circuit transitions to state 538, where it suspends the processor indicated by the power-gating signal. After suspending the processor, the power management circuit, returns to the idle state 530.

In response to a power-down request signal, the processing sub-system transitions to state 512 where it waits to be powered down. The power management circuit transitions to state 531, where it prompts circuits, which use shared circuits, for authorization to power-down. In response to receiving authorization signals from each sub-system that uses the shared circuits, the power management circuit enables the proxy interrupt controller and powers down the full power domain (FPD) at state 532. After which, the power management circuit returns to the idle state 530 and the processing sub-circuit transitions to the powered down state 508.

When enabled, the proxy interrupt control circuit monitors peripheral interrupts at state 522. In response to a peripheral interrupt for one of the processors powered by the full-power domain, the proxy interrupt control circuit generates a power up control signal at state 524. In response to the power-up control signal, the power management circuit powers up the full power domain in state 534 and then returns to the idle state 530. After the full power domain is powered up, the proxy interrupt control circuit transitions to the idle/disabled state 520 and the interrupt control circuit transitions back to state 506.

Figure 6:
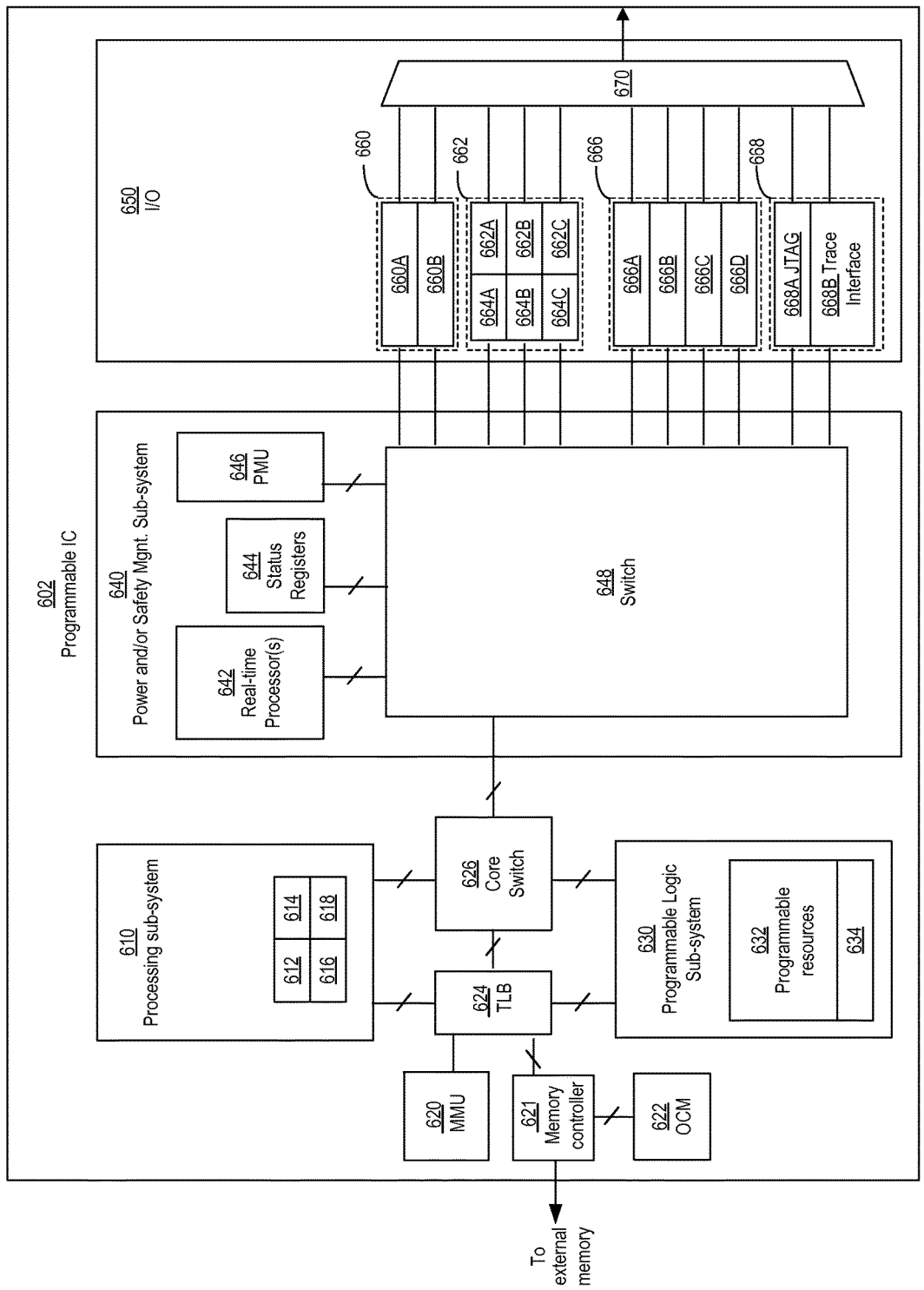
FIG. 6 shows a programmable IC that may be configured consistent with one or more implementations.

FIG. 6 shows a programmable IC 602 that may be configured in accordance with one or more implementations. The programmable IC may also be referred to as a System On Chip (SOC), which includes a processing sub-system 610 and a programmable logic sub-system 630. The processing sub-system 610 may be programmed to implement a software portion of the user design, via execution of a user program. The program may be specified as part of a configuration data stream or may be retrieved from an on-chip or off-chip data storage device. The processing sub-system 610 may include various circuits 612, 614, 616, and 618 for executing one or more software programs. The circuits 612, 614, 616, and 618 may include, for example, one or more processor cores, floating point units (FPUs), an interrupt processing unit, on chip-memory, memory caches, and/or cache coherent interconnect.

The programmable logic sub-system 630 of the programmable IC 602 may be programmed to implement a hardware portion of a user design. For instance, the programmable logic sub-system may include a number of programmable resources 632, which may be programmed to implement a set of circuits specified in a configuration data stream. The programmable resources 632 include programmable interconnect circuits, programmable logic circuits, and configuration memory cells. The programmable logic implements the logic of a user design using programmable elements that can include, for example, function generators, registers, arithmetic logic, and so forth. Programmable interconnect circuits may include a large number of interconnect lines of varying lengths interconnected by programmable interconnect points (PIPs).

The programmable resources 632 may be programmed by loading a configuration data stream into the configuration memory cells, which define how the programmable interconnect circuits and programmable logic circuits are configured. The collective states of the individual memory cells then determine the function of the programmable resources 632. The configuration data can be read from memory (e.g., from an external PROM) or written into the programmable IC 602 by an external device. In some implementations, configuration data may be loaded into configuration memory cells by a configuration controller 634 included in the programmable logic sub-system 630. In some other implementations, the configuration data may be loaded into the configuration memory cells by a start-up process executed by the processor sub-system 610.

The programmable IC 602 may include various circuits to interconnect the processing sub-system 610 with circuitry implemented within the programmable logic sub-system 630. In this example, the programmable IC 602 includes a core switch 626 that can route data signals between various data ports of the processing sub-system 610 and the programmable logic sub-system 630. The core switch 626 may also route data signals between either of the programmable logic or processing sub-systems 610 and 630 and various other circuits of the programmable IC, such as an internal data bus. Alternatively or additionally, the processing sub-system 610 may include an interface to directly connect with the programmable logic sub-system—bypassing the core switch 626. Such an interface may be implemented, for example, using the AMBA AXI Protocol Specification (AXI) as published by ARM.

In some implementations, the processing sub-system 610 and the programmable logic sub-system 630 may also read or write to memory locations of an on-chip memory 622 or off-chip memory (not shown) via memory controller 621. The memory controller 621 can be implemented to communicate with one or more different types of memory circuits including, but not limited to, Dual Data Rate (DDR) 2, DDR3, Low Power (LP) DDR2 types of memory, whether 16-bit, 32-bit, 16-bit with ECC, etc. The list of different memory types with which memory controller 621 is able to communicate is provided for purposes of illustration only and is not intended as a limitation or to be exhaustive. As shown in FIG. 6, the programmable IC 602 may include a memory management unit 620 and translation look-aside buffer 624 to translate virtual memory addresses used by the sub-systems 610 and 630 to physical memory addresses used by the memory controller 621 to access specific memory locations.

The programmable IC may include an input/output (I/O) sub-system 650 for communication of data with external circuits. The I/O sub-system 650 may include various types of I/O devices or interfaces including for example, flash memory type I/O devices, higher performance I/O devices, lower performance interfaces, debugging I/O devices, and/or RAM I/O devices.

The I/O sub-system 650 may include one or more flash memory interfaces 660 illustrated as 660A and 660B. For example, one or more of flash memory interfaces 660 can be implemented as a Quad-Serial Peripheral Interface (QSPI) configured for 4-bit communication. One or more of flash memory interfaces 660 can be implemented as a parallel 8-bit NOR/SRAM type of interface. One or more of flash memory interfaces 660 can be implemented as a NAND interface configured for 8-bit and/or 16-bit communication. It should be appreciated that the particular interfaces described are provided for purposes of illustration and not limitation. Other interfaces having different bit widths can be used.

The I/O sub-system 650 can include one or more of interfaces 662 providing a higher level of performance than memory interfaces 660. Each of interfaces 662A-662C can be coupled to a DMA controller 664A-664C respectively. For example, one or more of interfaces 662 can be implemented as a Universal Serial Bus (USB) type of interface. One or more of interfaces 662 can be implemented as a gigabit Ethernet type of interface. One or more of interfaces 662 can be implemented as a Secure Digital (SD) type of interface.

The I/O sub-system 650 may also include one or more interfaces 666 such as interfaces 666A-666D that provide a lower level of performance than interfaces 662. For example, one or more of interfaces 666 can be implemented as a General Purpose I/O (GPIO) type of interface. One or more of interfaces 666 can be implemented as a Universal Asynchronous Receiver/Transmitter (UART) type of interface. One or more of interfaces 666 can be implemented in the form of a Serial Peripheral Interface (SPI) bus type of interface. One or more of interfaces 666 can be implemented in the form of a Controller-Area-Network (CAN) type of interface and/or an I$^2$C type of interface. One or more of interfaces 666 also can be implemented in the form of a Triple Timer Counter (TTC) and/or a Watchdog Timer (WDT) type of interface.

The I/O sub-system 650 can include one or more debug interfaces 668 such as processor JTAG (PJTAG) interface 668A and a trace interface 668B. PJTAG interface 668A can provide an external debug interface for the programmable IC 602. Trace interface 668B can provide a port to receive debug, e.g., trace, information from the processing sub-system 610 or the programmable logic sub-system 630.

As shown, each of interfaces 660, 662, 666, and 668 can be coupled to a multiplexer 670. Multiplexer 670 provides a plurality of outputs that can be directly routed or coupled to external pins of the programmable IC 602, e.g., balls of the package within which the programmable IC 602 is disposed. For example, I/O pins of programmable IC 602 can be shared among interfaces 660, 662, 666, and 668. A user can configure multiplexer 670, via a configuration data stream to select which of interfaces 660-668 are to be used and, therefore, coupled to I/O pins of programmable IC 602 via multiplexer 670. The I/O sub-system 650, may also include a fabric multiplexer I/O (FMIO) interface (not shown) to connect interfaces 662-668 to programmable logic circuits of the programmable logic sub-system. Additionally or alternatively, the programmable logic sub-system 630 can be configured to implement one or more I/O circuits within programmable logic. In some implementations, the programmable IC 602 may also include a sub-system 640 having various circuits for power and/or safety management. For example, the sub-system 640 may include a power management unit 646 configured to monitor and maintain one or more voltage domains used to power the various sub-systems of the programmable IC 602. In some implementations, the power management unit 646 may disable power of individual sub-systems, when idle, to reduce power consumption, without disabling power to sub-systems in use.

The sub-system 640 may also include safety circuits to monitor the status of the sub-systems to ensure correct operation. For instance, the sub-system 640 may include one or more real-time processors 642 configured to monitor the status of the various sub-systems (e.g., as indicated in status registers 644). The real-time processors 642 may be configured to perform a number of tasks in responses to detecting errors. For example, for some errors, the real-time processors 642 may generate an alert in response to detecting an error. As another example, the real-time processors 642 may reset a sub-system to attempt to restore the sub-system to correct operation. The sub-system 640 includes a switch network 648 that may be used to inter connect various sub-systems. For example, the switch network 648 may be configured to connect the various sub-systems 610, 630, and 640 to various interfaces of the I/O sub-system 650. In some applications, the switch network 648 may also be used to isolate the real-time processors 642 from the sub-systems that are to be monitored. Such isolation may be required by certain application standards (e.g., IEC-61508 SIL3 or ISO-26262 standards) to ensure that the real-time processors 642 are not affected by errors that occur in other sub-systems.

The methods and circuits are thought to be applicable to a variety of systems and applications. Other aspects and features will be apparent to those skilled in the art from consideration of the specification. For example, though aspects and features may in some cases be described in individual figures, it will be appreciated that features from one figure can be combined with features of another figure even though the combination is not explicitly shown or explicitly described as a combination. It is intended that the specification and drawings be considered as examples only, with a true scope of the invention being indicated by the following claims.

What is claimed is:

1. An apparatus comprising:
a processing sub-system, including:
a plurality of processor circuits;
a shared circuit; and
an interrupt control circuit configured to, in response to a first peripheral interrupt, initiate performance of a task indicated by the peripheral interrupt by at least one of the plurality of processor circuits, wherein the processing sub-system is configured to generate a power-down control signal in response to suspension of the plurality of processor circuits;
a proxy interrupt control circuit configured and arranged to generate a power-up control signal in response to receiving a second peripheral interrupt and power to the processing sub-system being disabled; and
a power management circuit configured and arranged to:
disable power to the processing sub-system, including the interrupt control circuit, in response to the power-down control signal and the shared circuit being unused by another processing sub-system;
enable power to the processing sub-system in response to the power-up control signal; and
disable the proxy interrupt control circuit after enabling power to the processing sub-system.

2. The apparatus of claim 1, wherein the processing sub-system is further configured to, in response to one of the plurality of processor circuits being idle for a threshold period of time, suspend the one of the processor circuits.

3. The apparatus of claim 2, wherein:
the processing sub-system is configured to suspend the one of the plurality of processor circuits by generating a first power-gating control signal; and
the power management circuit is configured to disable power to the one of the plurality of processor circuits in response to the first power-gating control signal.

4. The apparatus of claim 1, wherein the processing sub-system is further configured to, in response to suspension of the plurality of processor circuits, enable the proxy interrupt control circuit prior to generating the power-down control signal.

5. The apparatus of claim 1, wherein the interrupt control circuit is configured and arranged to generate the power-down control signal in response to an input control signal.

6. The apparatus of claim 1, wherein the interrupt control circuit is configured to generate the power-down control signal in response to the suspension of the plurality of processor circuits.

7. The apparatus of claim 1, wherein one of the plurality of processor circuits is configured to generate the power-down control signal in response to the suspension of the plurality of processor circuits.

8. A system comprising:
a first sub-system including:
a shared circuit;
a plurality of processor circuits configured to perform one or more operations using the shared circuit; and
an interrupt control circuit configured to:
in response to a first peripheral interrupt, initiate performance of a task indicated by the peripheral interrupt by at least one of the plurality of processor circuits, wherein the first sub-system is configured to generate a power-down control signal in response to suspension of the plurality of processor circuits;
a second sub-system including a circuit configured to perform one or more operations using the shared circuit; and
a third sub-system including:
a proxy interrupt control circuit configured and arranged to generate a power-up control signal in response to receiving a second peripheral interrupt and power to the first sub-system being disabled; and
a power management circuit configured and arranged to:
disable power to the first sub-system, including the interrupt control circuit, in response to the power-down control signal and the shared circuit being unused by the first and second sub-systems; and
enable power to the first sub-system in response to the power-up control signal; and
disable the proxy interrupt control circuit after enabling power to the processing sub-system.

9. The system of claim 8, wherein the second sub-system is configured to, in response to the shared circuit being unused by the second sub-system, provide a respective power-down authorization signal to the power management circuit.

10. The system of claim 8, wherein the second sub-system includes programmable logic circuits.

11. The system of claim 8, wherein:
the shared circuit includes a memory controller; and
the plurality of processor circuits and the second sub-system are each configured to access a memory using the memory controller.

12. The system of claim 11, wherein the third sub-system includes a circuit configured to access the memory using the memory controller of the first sub-system.

13. The system of claim 8, wherein the first sub-system is further configured to, in response to one of the plurality of processor circuits being idle for a threshold period of time, suspend the one of the plurality of processor circuits.

14. The system of claim 13, wherein:
the first sub-system is configured to suspend the one of the plurality of processor circuits by generating a first power-gating control signal; and
the power management circuit is configured to disable power to the one of the plurality of processor circuits in response to the first power-gating control signal.

15. The system of claim 14, wherein:
the power management circuit is further configured to enable power to the one of the plurality of processor circuits in response to a second power-ungating control signal.

16. The system of claim 8, wherein the interrupt control circuit is further configured to enable the proxy interrupt control circuit prior to generating the power-down control signal.

17. A method, comprising:
using a power management circuit:
providing power to a first sub-system and a second sub-system, wherein the second sub-system is configured to perform one or more operations using a shared circuit of the first sub-system;

in response to a power-down request signal from the first sub-system:

continuing to provide power to the first sub-system while the shared circuit is being used by the second sub-system; and in response to the shared circuit being unused by the second sub-system, removing power from the first sub-system;

enabling a proxy interrupt controller prior to removing power from the first sub-system;

using the proxy interrupt controller, monitoring a data-bus for peripheral interrupts, and generating a power-up control signal in response to the peripheral interrupt;

using the power management circuit, providing power to the first sub-system; and disabling the proxy interrupt controller in response to providing power to the first sub-system.

18. The method of claim 17, further comprising:

using the second sub-system, generating a power-down authorization signal in response to the power-down request signal and the shared circuit being unused by the second sub-system.

* * * * *